US006690504B1

(12) United States Patent
Nagel et al.

(10) Patent No.: US 6,690,504 B1
(45) Date of Patent: Feb. 10, 2004

(54) SYSTEM AND METHOD FOR CONTROLLING SPECTRAL DISTRIBUTION OF OUTPUT POWER IN A RAMAN AMPLIFIER

(75) Inventors: Jonathan A. Nagel, Brooklyn, NY (US); Sergey Y. Ten, Horseheads, NY (US); Carl A. B. Clausen, Red Bank, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 13 days.

(21) Appl. No.: 10/099,104

(22) Filed: Mar. 14, 2002

Related U.S. Application Data

(60) Provisional application No. 60/276,426, filed on Mar. 16, 2001, provisional application No. 60/276,342, filed on Mar. 16, 2001, and provisional application No. 60/276,427, filed on Mar. 16, 2001.

(51) Int. Cl.[7] .................................................. H01S 3/00

(52) U.S. Cl. .................................. 359/334; 359/337.11

(58) Field of Search ............................ 359/334, 337.11, 359/341.4

(56) References Cited

U.S. PATENT DOCUMENTS 6,292,288 B1 * 9/2001 Akasaka et al. ............ 359/334
6,452,716 B1 * 9/2002 Park et al. .................. 395/334
6,510,000 B1 * 1/2003 Onaka et al. ............... 359/334

FOREIGN PATENT DOCUMENTS

EP 1 265 381 A2 * 12/2002
JP 2001007768 A * 1/2001

* cited by examiner

*Primary Examiner*—Mark Hellner

(57) ABSTRACT

A system and method for controlling gain shape in a Raman amplifier including a plurality of pumps. The pumps produce a spectral distribution of output power characteristic. A feedback control system provides one or more feedback control signals in response to the amplifier output for adjusting pump parameters to achieve a desired spectral distribution of output power characteristic.

28 Claims, 4 Drawing Sheets

SYSTEM AND METHOD FOR CONTROLLING SPECTRAL DISTRIBUTION OF OUTPUT POWER IN A RAMAN AMPLIFIER

CROSS-REFERENCE TO RELATED APPLICATIONS

The present application claims the benefit of U.S. provisional application Nos. 60/276,426, 60/276,342, and 60/276,427 each filed Mar. 16, 2001, the teachings of which are incorporated herein by reference.

FIELD OF THE INVENTION

This invention relates in general to optical communication systems, and in particular to a system and method for controlling spectral distribution of output power in Raman amplifiers.

BACKGROUND OF THE INVENTION

Optical communication networks, in particular long-haul networks of lengths between 600 kilometers and 10,000 kilometers, inevitably suffer from signal attenuation due to variety of factors including scattering, absorption, and bending. To compensate for losses, optical amplifiers, regenerators, or a combination thereof are typically placed at regular intervals along the optical transmission path. Optical amplifiers amplify an input optical signal without converting it into electrical form. In contrast, regenerators convert optical signals into electrical form and then back to optical form in order to amplify, reshape, retime, and retransmit the optical signal.

Optical amplifiers include rare earth doped fibers such as erbium doped fiber amplifiers (EDFAs) and Raman amplifiers. An EDFA operates by passing an optical signal through an erbium-doped fiber segment, and "pumping" the segment with light from another source such as a laser. Raman amplification occurs throughout an optical transmission fiber when the transmission fiber is pumped at an appropriate wavelength or wavelengths. Gain is then achieved at a longer wavelength through the process of Stimulated Raman Scattering. The difference between the Raman amplifier pumped wavelength and the associated amplified wavelength spectrum at the longer wavelength is referred to as a "Stokes shift." The Stokes shift for a typical silica fiber is approximately 13 THz. Hence, Raman amplifiers provide amplification of an optical signal without the need for a specially doped fiber, such as used in an EDFA.

Many optical communication systems, especially long-haul networks, are wavelength division multiplexed (WDM) or dense wavelength division multiplexed (DWDM) systems. Such systems incorporate a plurality of information channels carried by slightly different wavelengths. Accordingly, optical amplifiers in such systems should be capable of amplifying all the wavelengths at a relatively consistent gain level in a broad wavelength range.

A Raman amplifier with a single pump may fail to provide gain over the bandwidth required in some WDM and DWDM optical systems. To achieve a broadband gain characteristic, a plurality of pumps may be utilized in a single Raman amplifier. However, the gain spectrum from each pump tends to overlap such that a multi-pump Raman amplifier typically exhibits some gain variation over the spectral range of the amplifier, known as "ripple." This disparity in imparted gain can negatively effect signal detection and system reliability.

In addition, in many systems, the distance and losses between optical amplifiers varies over a wide range. This makes the input powers to the amplifiers different. Since the actual launched powers at the output of each amplifier must be carefully controlled, the actual gains over each amplifier are different. The preferred operating conditions of each amplifier is constant or controlled spectral distribution of output power.

Accordingly, there is a need for a Raman amplifier pump configuration and method that overcomes the deficiencies of the prior art by providing a desired spectral distribution of output power characteristic across a transmitted range of wavelengths in a Raman amplifier for all possible spectral distributions of the input power.

BRIEF SUMMARY OF THE INVENTION

An amplifier consistent with the invention includes a plurality of pumps and a feedback control system. The pumps produce an amplifier gain characteristic. The control system is configured to receive an output signal representative of an output of the amplifier and provide at least one control signal to at least one of the pumps in response to the output signal. The control signal causes adjustment of at least one adjustable parameter of the pump to achieve a desired amplifier gain characteristic. An optical communication system consistent with the invention includes a transmitter for transmitting an optical signal on an optical information channel and an amplifier consistent with the invention coupled to the information channel.

A method of obtaining a desired gain characteristic for an optical amplifier including a plurality of pumps consistent with the invention includes: detecting an output signal representative of an output of the amplifier; generating at least one control signal in response to the output signal; and adjusting at least one adjustable parameter of at least one of the pumps in response to the control signal to achieve the desired amplifier spectral distribution of output power characteristic.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
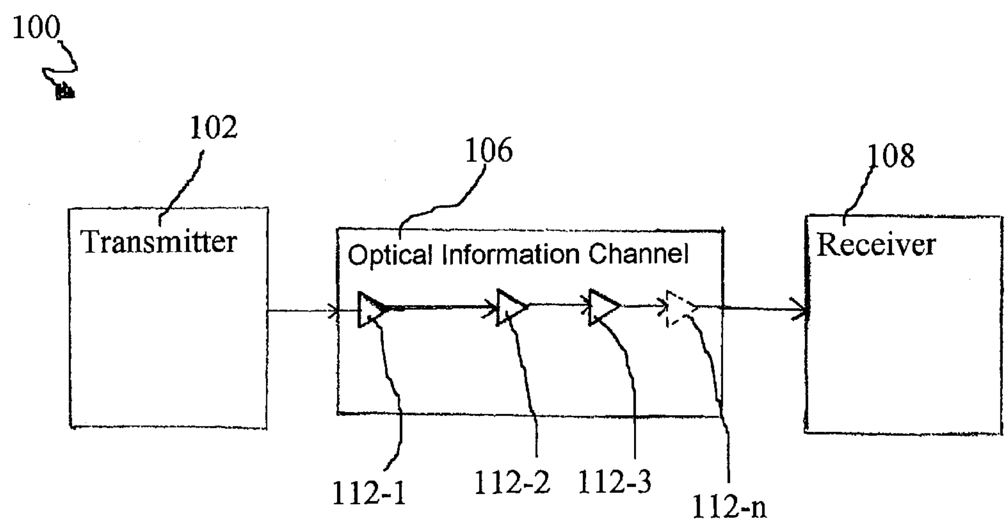
FIG. 1 is a block diagram of an exemplary optical communication system consistent with the present invention.

Turning now to FIG. 1, there is illustrated an exemplary optical communication system 100 consistent with the present invention. Those skilled in the art will recognize that the system 100 has been depicted as a highly simplified point-to-point system for ease of explanation. It is to be understood that the present invention is not limited to illustrated exemplary embodiments described herein. In fact, the present invention may be incorporated into a wide variety of optical networks, systems and devices without departing from the spirit and scope of the invention.

The optical communication system 100 includes a transmitter 102 and a receiver 108 connected via an optical information channel 106. At the transmitter, data may be modulated on a plurality of optical wavelengths for transmission over the optical information channel 106. Depending on system characteristics and requirements, the optical information channel 106 may include an optical fiber waveguide, optical amplifiers 112-1, 112-2, 112-3, . . . 112-n, regenerators, optical filters, dispersion compensating modules, and other active and passive components. A variety of configurations for each of these elements will be known to those skilled in the art.

For clarity, only optical amplifiers 112-1, 112-2, 112-3, . . . 112-n are illustrated in FIG. 1. Advantageously, the Raman amplifiers may be configured, in a manner to be described in greater detail below, to provide a desired spectral distribution of output power characteristic curve. The distribution may ideally be substantially flat over the range of transmitted wavelengths.

Figure 2:
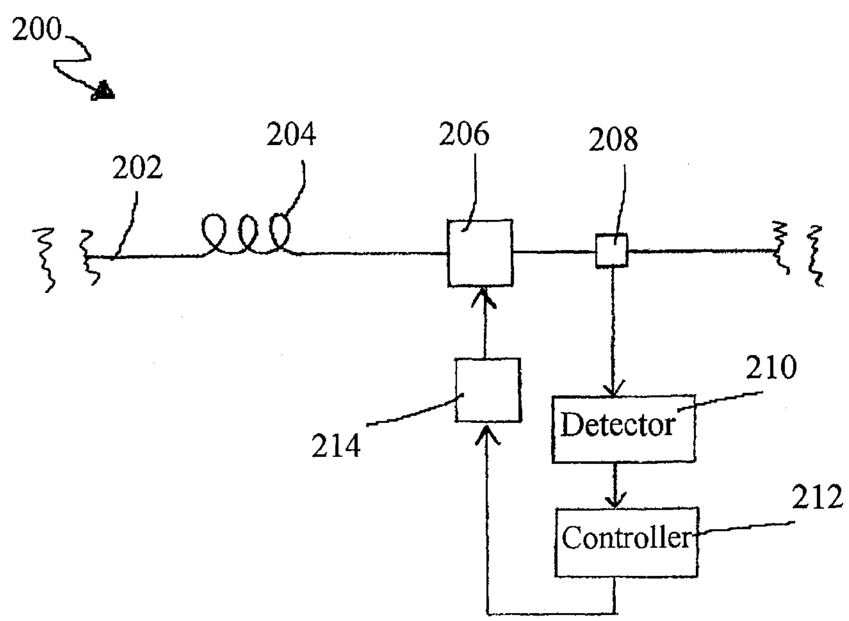
FIG. 2 is a block diagram of an exemplary Raman amplifier configuration consistent with the invention including a feedback control system.

Turning to FIG. 2, there is illustrated a block diagram of an exemplary Raman amplifier configuration 200 for providing a desired gain characteristic consistent with the invention. The Raman amplifier 200 includes a fiber transmission path segment 204 in which Raman gain is to be generated by coupling pump power from a pump source 214 through a coupler 206. The pump source 214 may include a plurality of pumps provided in a wide variety of configurations. A number of pump sources are known to those skilled in the art, including, for example, laser pump sources. A variety of couplers 206 for combining the pump powers and injecting the pump power at different wavelengths into the transmission fiber 202 are also known, e.g. optical couplers or a pump multiplexer. A separate coupler may be provided for each pump or, as shown, a single coupler 206 may be provided for injecting a plurality of pump wavelengths into the transmission fiber 202.

Advantageously, a feedback control system, which will later be more fully described, including a splitter 208, a detector 210, and a controller 212 is configured to provide feedback monitoring and control of gain for the Raman amplifier 200. In general, the feedback control system detects the power level in segments of the transmitted wavelength spectrum at the output of the amplifier. Based on the detected power levels, the amplifier pumps are dynamically adjusted to obtain a desired amplifier spectral distribution of output power characteristic.

In the illustrated exemplary embodiment, the splitter 208 directs some portion of the total power in the transmitted spectrum, e.g. 2%, to the detector. The detector 210 detects the relative power in various segments of the transmitted spectrum and provides a signal representative of the relative power levels in each segment to the controller. In a manner to be described in greater detail below, the controller adjusts the parameters of the amplifier pumps in response to the signals from the detector in order to obtain a desired spectral distribution of output power from the amplifier. Those skilled in the art will recognize that splitter 208 may take a variety of configurations including a 1%, 5%, or 10% splitter, a WDM coupler, or an isolator and wavelength selective refractor.

Figure 3A:
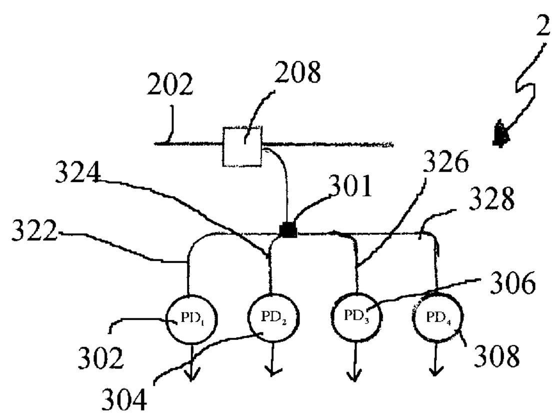
FIG. 3A, 3B, and 3C illustrate three separate exemplary embodiments for a detector useful in the exemplary Raman amplifier configuration of FIG. 2.

The detector 210 may also be provided in various embodiments. FIG. 3A illustrates one exemplary embodiment of a detector 210A useful in connection with the present invention. The detector 210A includes a demultiplexer 301 configured to receive a portion of the transmitted spectrum from the splitter 208, and to divide that transmitted spectrum into a plurality of spectral segments. The transmitted spectrum for an exemplary WDM system may include a plurality of channels in a range of C-band wavelengths from about 1520 nm to 1560 nm. In this case, the demultiplexer 301 may split the spectrum into four spectral segments from 1520 nm–1530 nm, 1530 nm–1540 nm, 1540 nm–1550 nm, and 1550 nm–1560 nm.

Each of the spectral segments from the demultiplexer may be provided on an associated path 322, 324, 326, 328 to an associated photo-detector 302, 304, 306, 308. Each photo-detector 302, 304, 306, 308 provides an output signal representative of the intensity or power of the light imparted thereon. Thus, the relative power level of the transmitted signal in each of the spectral segments is represented by the outputs of the photo-detectors.

As will be described in greater detail below, the outputs of the photo-detectors are provided to the controller, which adjusts the amplifier pumps to obtain a desired gain characteristic. The number of spectral segments provided by the demultiplexer for detection by the photo-detectors directly affects the ability of the feedback control system to obtain a desired gain shape. Thus, although four photo-detectors are illustrated in the detector 210A, those skilled in the art will recognize that two or more photo-detectors may be used.

Figure 3B:
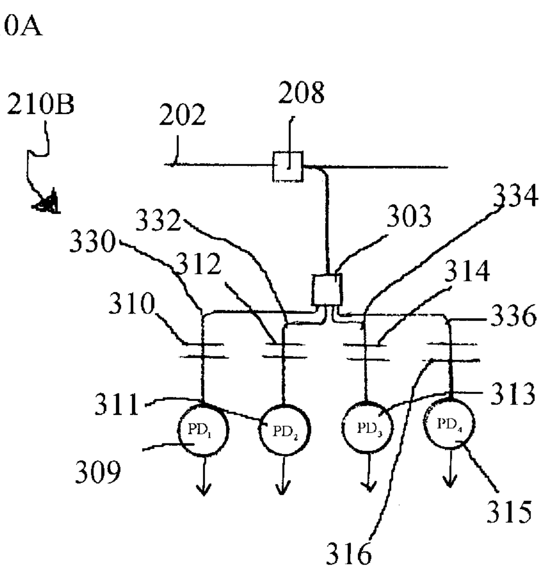

FIG. 3B illustrates another exemplary embodiment 210B of a detector useful in connection with the present invention. The detector 210B includes a splitter 303 and a plurality of optical filters 310, 312, 314, 316. The splitter 303 receives a portion of the transmitted signal from the splitter 208 and splits the received portion onto a plurality of paths 330, 332, 334, 336, each of which is coupled to an associated filter 310, 312, 314, 316. The transmittance characteristic of each filter is configured so that each filter transmits an associated segment of the transmitted spectrum to an associated photo-detector. Also the transmittance characteristics for each filter should be narrow enough to not overlap with other filters so that the detected light intensity will not overlap between associated photo-detectors 309, 311, 313, 315.

For example, in a WDM or DWDM system with channels at wavelengths in the C-Band from about 1520 nm to 1560 nm, the first optical filter 310 may pass the segment of the transmitted wavelengths from 1520 nm–1530 nm, the second optical filter 312 may pass the segment from 1530 nm–1540 nm, the third optical filter 314 may pass the segment from 1540 nm–1550 nm, and the fourth optical filter 316 may pass the segment from 1550 nm–1560 nm. Again, each spectral segment is provided to an associated photo-detector 309, 311, 313, 315, each of which provides an output representative of the light intensity in the segment imparted thereon. Although four filters and photo-detectors are illustrated in FIG. 3B, those skilled in the art will recognize that two or more filters and associated photo-detectors may be used.

Figure 3C:
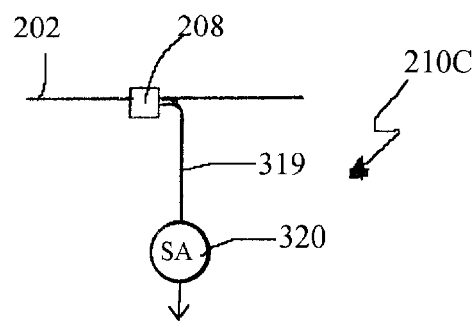

FIG. 3C illustrates yet another embodiment 210C of a detector useful in connection with the present invention. The embodiment 210C includes a known optical spectrum analyzer 320. In this instance, the optical spectrum analyzer 320 may be utilized to detect the spectral distribution of output power characteristic for a Raman amplifier, and provide an output to the controller representative of the relative spectral power density in various segments of the transmitted spectrum. The controller modifies the amplifier pump parameters in response to the spectrum analyzer output to achieve a desired amplifier gain characteristic.

In one embodiment, detector 210 may detect and deliver to the controller 212, a number M of detected signals, each being associated with a different segment of the transmitted spectrum. The number M may be greater than or equal to the total number N of pump control parameters. Pump control parameters include the adjustable variables for each Raman pump, which may include power and/or wavelength. For example, in an embodiment consistent with the invention that includes four pumps, each of which including two adjustable control parameters, e.g. wavelength and power, then the total number of pump parameters would be eight. The number M of detected signals may be, in this particular case, greater than or equal to eight. The controller 212 includes a control algorithm to accept the M detected signals and deliver a corresponding number of control signals for initiating adjustments to one or more of the N pump parameters to achieve a desired amplifier gain characteristic.

Figure 4:
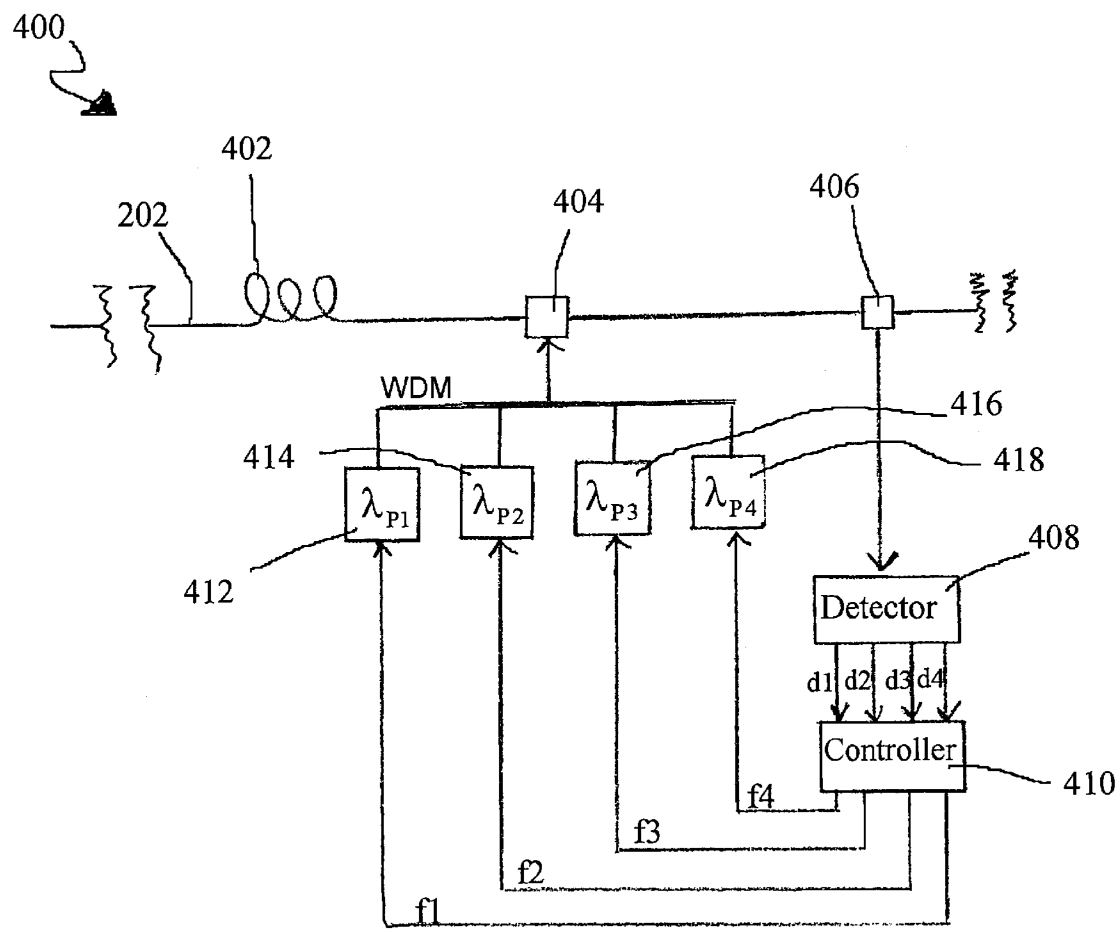
FIG. 4 is a block diagram of an exemplary Raman amplifier consistent with the invention including four pumps and a feedback control system.

Turning to FIG. 4, there is provided a block diagram of another exemplary Raman amplifier configuration 400 consistent with the invention. The configuration 400 includes four pumps 412, 414, 416, 418 and a feedback control system for monitoring and controlling gain of the amplifier. The basic operation of FIG. 4 is similar to that previously described in reference to FIG. 2. Those skilled in the art will recognize that each of the four pumps 412, 414, 416, 418 will generate an associated gain characteristic, and each pump may have its own pump parameters that may be controlled by feedback signals $f_1$, $f_2$, $f_3$, $f_4$ from the controller 410.

Figure 5:
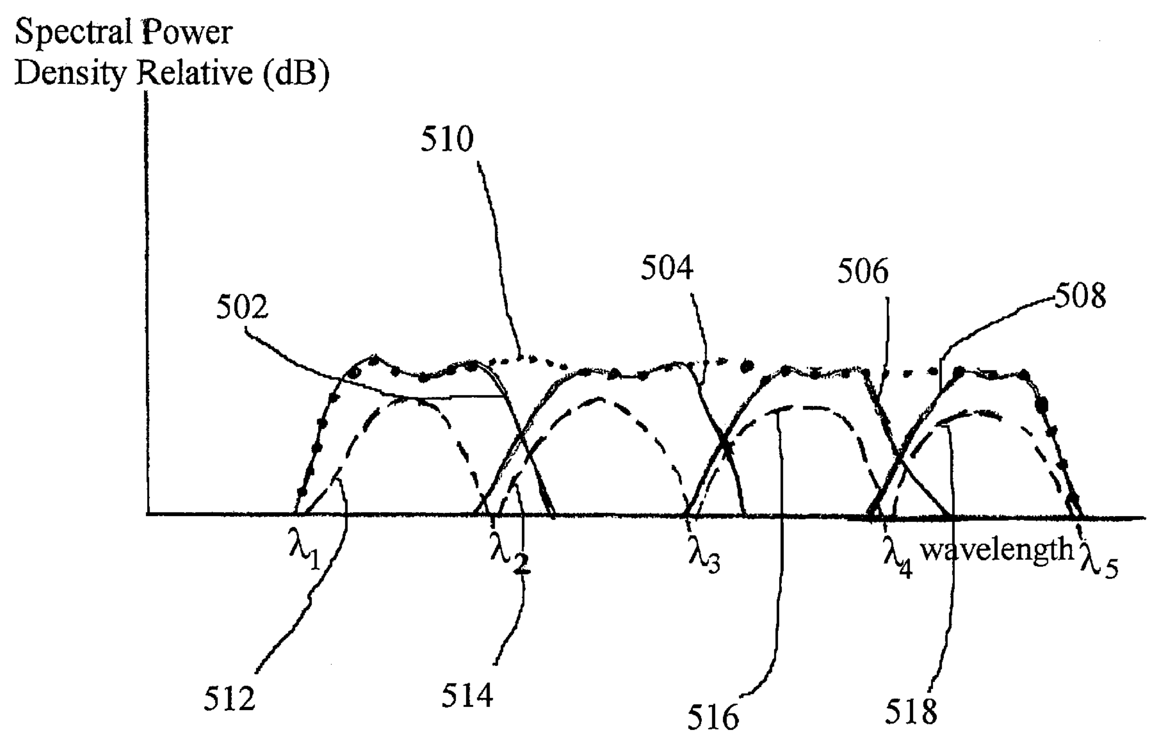
FIG. 5 is an exemplary plot of spectral power density versus wavelength associated with the Raman amplifier configuration of FIG. 4.

FIG. 5 illustrates an exemplary plot of relative spectral power density versus wavelength associated with the exemplary Raman amplifier configuration 400 of FIG. 4. The four pumps 412, 414, 416, 418 generate optical power at different associated wavelength $\lambda_{P1}$, $\lambda_{P2}$, $\lambda_{P3}$, and $\lambda_4$. Those skilled in the art will recognize that each pump generates an associated Raman gain which has a characteristic gain shape with a peak separated by about 100 nm from the pump wavelength.

Exemplary gain characteristics 502, 504, 506, 508 resulting respectively from the first 412, second 414, third 416, and fourth 418 pumps are illustrated in FIG. 5. The combination of the pump gain characteristics 502, 504, 506, 508 produce an amplifier gain characteristic 510 encompassing the range of transmitted wavelengths (between $\lambda_1$ and $\lambda_5$ in FIG. 5). This transmitted wavelength spectrum may vary with each optical transmission system and may be in the C-band, e.g. between about 1520 nm and 1560 nm. As shown, the amplifier gain characteristic 510 may include some "ripple." In one embodiment, the feedback control system may control the pump parameters to achieve a spectral distribution of output power characteristic that is substantially flat over the transmitted wavelength spectrum.

In exemplary embodiment illustrated in FIG. 4, a four-way splitter with four filters, as illustrated, for example, in FIG. 3B, may be used as the detector 408. The transmittance characteristics of the detector filters may be configured as illustrated in FIG. 5. The first filter may exhibit a transmittance characteristic 512 to allow a first spectral segment of the transmitted spectrum between $\lambda_1$ and $\lambda_2$ to pass. Similarly, the second filter may exhibit a transmittance characteristic 514 to allow a second spectral segment between $\lambda_2$ and $\lambda_3$ to pass, the third filter may pass a third spectral segment between $\lambda_3$ and $\lambda_4$, and the fourth filter may pass a fourth spectral segment between $\lambda_4$ and $\lambda_5$. Even though four spectral segments are illustrated in FIG. 5, those skilled in the art will recognize that the transmitted spectrum may be divided into two or more spectral segments without departing from the scope of the present invention. Generally, the more spectral segments used, the greater the ability to more finely tune the amplifier gain characteristic. Of course, the number of segments may be dictated by system characteristics, as well as cost considerations.

An associated photo-detector detects the light intensity or power in dBm for each spectral segment, and provides an output signal representative thereof. The output signals from the detectors are representative of the spectral distribution of output power characteristic of the amplifier. The output signals are coupled to the controller, which adjusts the amplifier pump parameters in response to the detector outputs to achieve a desired spectral distribution of output power from the amplifier. For example, in an embodiment where a substantially flat spectral distribution of output power from the amplifier is desired, the power or light intensity associated with each segment may be set at a fixed power output. To accomplish this, the outputs from the controller may adjust each of the first, second, third, and fourth pumps to an appropriate wavelength and power output. Advantageously, a controller consistent with this invention may continuously monitor the amplifier gain characteristic to ensure that the output power for each spectral segment remains at a fixed level despite changing operating conditions.

Fixing the output power of each spectral segment in such fashion has several advantages. First, noise penalties from long optical channel spans with a plurality of Raman amplifiers are mitigated. Second, when such a Raman amplifier precedes an EDFA in an optical information channel, the performance of the EDFA may be improved because a constant power input from the Raman amplifier contributes to a substantially constant EDFA gain despite varying span losses between optical amplifiers. In addition, a Raman amplifier consistent with the present invention may function as a dynamic gain control device, with a resolution determined by the width of the chosen spectral segment. Further, if one of a plurality of pumps fails, a Raman amplifier consistent with the invention provides for self-healing. In other words, the pump parameters for the remaining pumps will be modified to produce the desired spectral distribution of output power characteristic.

As illustrated in FIG. 5, the pump gain characteristics 502, 504, 506, 508 typically overlap. The transmittance characteristics of the filters may thus overlap wavelengths encompassed by two or more of the pump gain characteristics. For example, the transmittance characteristic 514 of the second filter may pass wavelengths affected by the first 502, second 504, and third 506 pump gain characteristics. Advantageously, a controller 410 consistent with the present invention may be linked to take into account these overlapping affects. A linked control algorithm may be structured several ways. First, the control algorithm may utilize a global approach. This global approach uses detector feedback signals, e.g. $d_1$, $d_2$, $d_3$, $d_4$, to develop a Raman amplifier model. The model computationally selects N pump parameters to give the desired spectral distribution of output power characteristic and communicates this to the pumps 412, 414, 416, 418 via associated control feedback signals $f_1$, $f_2$, $f_3$, $f_4$.

Another approach is a strongly linked iterative approach. In such approach, the N pump parameters are perturbed, and then the detector produces signals $d_1$, $d_2$, $d_3$, $d_4$, each of which is representative of the light intensity or power level in an associated one of the segments. A number of corrections equal to the pump parameters N is then computed and simultaneously applied. A somewhat similar approach is a weakly linked iterative approach. Under such approach, the first pump parameter is perturbed and then the detector produces signals $d_1$, $d_2$, $d_3$, $d_4$. A second pump parameter correction is then calculated and applied. All detected signals are then read again, and the third pump parameter correction is then calculated and applied. Similarly, the process continues in an iterative fashion for each pump parameter until all pump parameters for all pumps are corrected and applied.

Yet another approach is a dithering approach. In this approach, each of the N pump parameters is dithered at N different frequencies. Dithering is a process known to those skilled in the art of vibrating or quivering the frequency about its initial value. The detector signals are then decompressed or filtered at the N dithered frequencies. The recovered signal at the dithered frequency is used to control the pump parameters.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. An optical amplifier comprising:

a plurality of pumps configured to produce gain in an optical transmission fiber through Stimulated Raman Scattering said gain establishing an output power spectral distribution characteristic of said amplifier; and a feedback control system coupled to an output of said amplifier, said control system comprising:

a detector configured to provide a plurality of detected signals, each of said detected signals being representative of the power in an associated spectral segment of said output of said amplifier, a controller for providing a plurality of control signals in response to said detected signals, each of said control signals being provided to an associated one of said pumps for causing adjustment of at least one adjustable parameter of said associated one of said pumps to achieve a desired output power spectral distribution characteristic for said amplifier.

2. The amplifier of claim 1, wherein each of said spectral segments are substantially equal in length.

3. The amplifier of claim 1, wherein said desired output power spectral distribution characteristic comprises a constant power in each of said spectral segments.

4. The amplifier of claim 1, wherein said at least one parameter comprises an output wavelength of said associated one of said pumps.

5. The amplifier of claim 1, wherein said at least one parameter comprises an output power of said associated one of said pumps.

6. The amplifier of claim 1, wherein said output of said amplifier comprises a range of wavelengths, and wherein said desired output power spectral distribution characteristic encompasses said range of wavelengths.

7. The amplifier of claim 1, wherein said output of said amplifier comprises a range of wavelengths between about 1520 nm and about 1560 nm, and wherein said desired output power spectral distribution characteristic encompasses said range of wavelengths.

8. The amplifier of claim 1, wherein said control system comprises a spectrum analyzer.

9. The amplifier of claim 1, wherein the number of said control signals is greater than or equal to a total number of said adjustable parameters for said plurality of pumps.

10. The amplifier of claim 1, wherein said detector comprises a splitter for splitting an output signal representative of said output of said amplifier onto a plurality of paths, each of said paths being coupled to an associated filter configured to transmit one of said associated spectral segments to an associated photo-detector, said photo detectors each providing an associated one of said detected signals.

11. The amplifier of claim 1, wherein said detector comprises a demultiplexer for separating an output signal representative of said output of said amplifier into said associated spectral segments, each of said segments being provided on an associated optical path coupled to an associated photo-detector, said photo detectors each providing an associated one of said detected signals.

12. An optical communication system comprising:

a transmitter configured to transmit a plurality of optical signals, each at one of a plurality of wavelengths, over an optical information channel, said optical information channel comprising an optical amplifier, said amplifier comprising:

a plurality of pumps coupled to said optical information channel to produce gain in said optical information channel through Stimulated Raman Scattering said gain having an amplifier gain characteristic; and p2 a feedback control system coupled to an output of said amplifier, said control system comprising:

a detector configured to provide a plurality of detected signals, each of said detected signals being representative of the power in an associated spectral segment of said output of said amplifiers, a controller for providing a plurality of control signals in response to said detected signals, each of said control signals being provided to an associated one of said pumps for causing adjustment of at least one adjustable parameter of said associated one of said pumps to achieve a desired output power spectral distribution characteristic for said amplifier.

13. The system of claim 12, wherein each of said spectral segments are substantially equal in length.

14. The system of claim 12, wherein said desired output power spectral distribution characteristic comprises a constant power in each of said spectral segments.

15. The system of claim 12, wherein said at least one parameter comprises an output wavelength of said associated one of said pumps.

16. The system of claim 12, wherein said at least one parameter comprises an output power of said associated one of said pumps.

17. The system of claim 12, wherein said output of said amplifier comprises a range of wavelengths, and wherein said desired output power spectral distribution characteristic encompasses said range of wavelengths.

18. The system of claim 12, wherein said output of said amplifier comprises a range of wavelengths between about 1520 nm and about 1560 nm, and wherein said desired output power spectral distribution characteristic encompasses said range of wavelengths.

19. The system of claim 12, wherein the number of said control signals is greater than or equal to a total number of said adjustable parameters for said plurality of pumps.

20. The system of claim 12, wherein said detector comprises a splitter for splitting an output signal representative of said output of said amplifier onto a plurality of paths, each of said paths being coupled to an associated filter configured to transmit one of said associated spectral segments to an associated photo-detector, said photo detectors each providing an associated one of said detected signals.

21. The system of claim 12, wherein said detector comprises a demultiplexer for separating an output signal representative of said output of said amplifier into said associated spectral segments, each of said segments being provided on an associated optical path coupled to an associated photo-detector, said photo detectors each providing an associated one of said detected signals.

22. A method of obtaining a desired spectral distribution of output power characteristic for Raman amplifier including a plurality of pumps, said method comprising:

detecting power in a plurality of spectral segments of an output signal representative of an output of said Raman amplifier;

generating at least one control signal, each control signal being in response to the power detected in an associated one of said plurality of said spectral segments of said output signal; and adjusting at least one adjustable parameter of at least one of said pumps in response to said at least one control signal to achieve said desired output power spectral distribution characteristic.

23. The method of claim 22, wherein a plurality of said control signals are generated in said generating step, and wherein each control signal adjusts an associated one of said adjustable parameters for an associated one of said pumps in said adjusting step.

24. The method of claim 22, wherein said desired output power spectral distribution characteristic comprises a constant power in each of said spectral segments.

25. The method of claim 22, wherein said at least one parameter comprises an output wavelength of said at least one of said pumps.

26. The method of claim 22, wherein said at least one parameter comprises an output power of said at least one of said pumps.

27. The method of claim 22, wherein said output signal comprises a range of wavelengths, and wherein said desired output power spectral distribution characteristic encompasses said range of wavelengths.

28. The method of claim 22, wherein said output signal comprises a range of wavelengths between about 1520 nm and about 1560 nm, and wherein said desired output power spectral distribution characteristic encompasses said range of wavelengths.

* * * * *